(12) United States Patent
Erno et al.

(10) Patent No.: US 10,987,733 B2
(45) Date of Patent: Apr. 27, 2021

(54) COMPONENTS HAVING VIBRATION DAMPERS ENCLOSED THEREIN AND METHODS OF FORMING SUCH COMPONENTS

(71) Applicant: General Electric Company, Schenectady, NY (US)

(72) Inventors: Daniel Jason Erno, Clifton Park, NY (US); Robert Arvin Hedeen, Clifton Park, NY (US); Prabhjot Singh, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 15/903,010

(22) Filed: Feb. 22, 2018

(65) Prior Publication Data

US 2018/0180133 A1    Jun. 28, 2018

Related U.S. Application Data

(62) Division of application No. 13/972,336, filed on Aug. 21, 2013, now Pat. No. 9,903,434.

(51) Int. Cl.
*F01D 5/16* (2006.01)
*B22F 5/04* (2006.01)
(Continued)

(52) U.S. Cl.
CPC ............ *B22F 3/1055* (2013.01); *B22F 5/009* (2013.01); *B22F 5/04* (2013.01); *B22F 7/06* (2013.01); *F01D 5/16* (2013.01); *F01D 25/06* (2013.01); *F02C 3/04* (2013.01); *F16F 9/10* (2013.01); *F16F 9/30* (2013.01); *F16F 15/366* (2013.01); *B29K 2101/10* (2013.01); *B29K 2101/12* (2013.01); *B33Y 10/00* (2014.12); *B33Y 80/00* (2014.12); *F05D 2220/36* (2013.01); *F05D 2230/30* (2013.01); *F05D 2230/31* (2013.01);
(Continued)

(58) Field of Classification Search
CPC ........ F01D 5/16; F01D 25/06; F05D 2230/30; F05D 2230/31; F05D 2220/36; F05D 2260/96
See application file for complete search history.

(56) References Cited

U.S. PATENT DOCUMENTS 9,028,219 B2 * 5/2015 Clark ...................... F01D 5/147
                                                                    416/229 A
2005/0186082 A1 * 8/2005 Kayser ...................... F01D 5/16
                                                                    416/241 R
(Continued)

FOREIGN PATENT DOCUMENTS

DE     10 2010 046 579 A1    3/2012
JP          2010-242940 A   10/2010

*Primary Examiner* — Ehud Gartenberg
*Assistant Examiner* — Henry Ng
(74) *Attorney, Agent, or Firm* — Dinsmore & Shohl LLP

(57) ABSTRACT

A component formed by an additive manufacturing process includes a body and a first vibration damper. The body is formed from an additive manufacturing material, and defines at least a first cavity completely enclosed within the body. The first vibration damper is disposed within the first cavity. The first vibration damper includes a flowable medium and a first solidified element formed from the additive manufacturing material. The flowable medium surrounds the first solidified element.

16 Claims, 3 Drawing Sheets

(51) Int. Cl.

| | |
|---|---|
| *F02C 3/04* | (2006.01) |
| *F01D 25/06* | (2006.01) |
| *B22F 3/105* | (2006.01) |
| *B22F 5/00* | (2006.01) |
| *F16F 15/36* | (2006.01) |
| *B22F 7/06* | (2006.01) |
| *F16F 9/10* | (2006.01) |
| *F16F 9/30* | (2006.01) |
| *B33Y 10/00* | (2015.01) |
| *B33Y 80/00* | (2015.01) |
| *B29K 101/10* | (2006.01) |
| *B29K 101/12* | (2006.01) |

(52) U.S. Cl.
CPC .......... *F05D 2260/96* (2013.01); *Y02P 10/25* (2015.11); *Y10T 428/24612* (2015.01)

(56) References Cited

U.S. PATENT DOCUMENTS

| | | | |
|---|---|---|---|
| 2013/0039774 A1* | 2/2013 | Viens | F01D 5/147 416/226 |
| 2013/0058785 A1 | 3/2013 | Kellerer et al. | |
| 2013/0064676 A1* | 3/2013 | Salisbury | F01D 5/147 416/229 R |
| 2013/0280082 A1* | 10/2013 | Propheter-Hinckley | B22F 3/1055 416/223 R |

\* cited by examiner

COMPONENTS HAVING VIBRATION DAMPERS ENCLOSED THEREIN AND METHODS OF FORMING SUCH COMPONENTS

BACKGROUND

The field of the disclosure relates generally to vibration dampers and, more particularly, to components having vibration dampers enclosed therein, and methods of forming such components.

Vibration of mechanical components may induce component fatigue and excessive localized noise within mechanical systems, such as gas turbine engines. Accordingly, reducing vibrational loading of mechanical components within such mechanical systems is a priority among producers and users of such systems.

At least some known attempts to reduce vibrational loading of mechanical components include incorporating particle-filled cavities within the mechanical components.

However, such known particle-Idled cavities incorporated into mechanical components generally do not reduce vibrational loading of such components to a satisfactory level. Moreover, fabrication of such components generally requires separate steps for forming the cavities, evacuating the cavities, and re-filling the cavities with particle-damping powders. Further, because the cavities must be accessible after the component is formed in order to evacuate and re-fill the cavities, the locations at which particle-filled cavities may be formed within mechanical components are limited.

BRIEF DESCRIPTION

In one aspect, a component formed by an additive manufacturing process is provided. The component includes a body formed from an additive manufacturing material, and a first vibration damper. The body defines at least a first cavity completely enclosed within the body. The vibration damper is disposed within the first cavity. The vibration damper includes a flowable medium and a first solidified element formed from the additive manufacturing material. The flowable medium surrounds the first solidified element.

In another aspect, a gas turbine engine is provided. The gas turbine engine includes a combustor assembly, a turbine assembly, and a compressor assembly. The combustor assembly includes a plurality of fuel mixers. The turbine assembly includes a plurality of turbine blades. The compressor assembly includes a plurality of fan blades. At least one of the combustor assembly, fuel mixers, turbine blades, and fan blades include a component formed by an additive manufacturing process. The component includes a body formed from an additive manufacturing material, and a first vibration damper. The body defines at least a first cavity completely enclosed within the body. The vibration damper is disposed within the first cavity. The vibration damper includes a flowable medium and a first solidified element formed from the additive manufacturing material. The flowable medium surrounds the first solidified element.

In yet another aspect, a method of forming a component by an additive manufacturing process is provided. The method includes forming a body of the component from an additive manufacturing material, forming a first cavity within the body, and forming a first vibration damper within the first cavity. Forming a first vibration damper within the first cavity includes forming a first solidified element by selectively solidifying the additive manufacturing material, and enclosing the first solidified element and a flowable medium within the first cavity.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The components, systems, and methods described herein enable efficient use of additive manufacturing technology to form vibration dampers within components. Specifically, the components, systems, and methods described herein take advantage of the additive nature of additive manufacturing processes by strategically capturing, and enclosing unsolidified additive manufacturing material and/or solidified element(s) within one or more cavities formed in the component during the additive manufacturing process. The vibration dampers may be precisely formed and strategically positioned within the component so as to not compromise the structural integrity of the component. Further, through use of additive manufacturing technology, the components, systems, and methods described herein enable formation of particle vibration dampers at locations within the component that are otherwise inaccessible. Therefore, in contrast to known articles and methods of manufacturing such articles, the components, systems, and methods described herein facilitate fabrication of components having vibration dampers enclosed therein, and provide improved damping performance over known articles.

Figure 1:
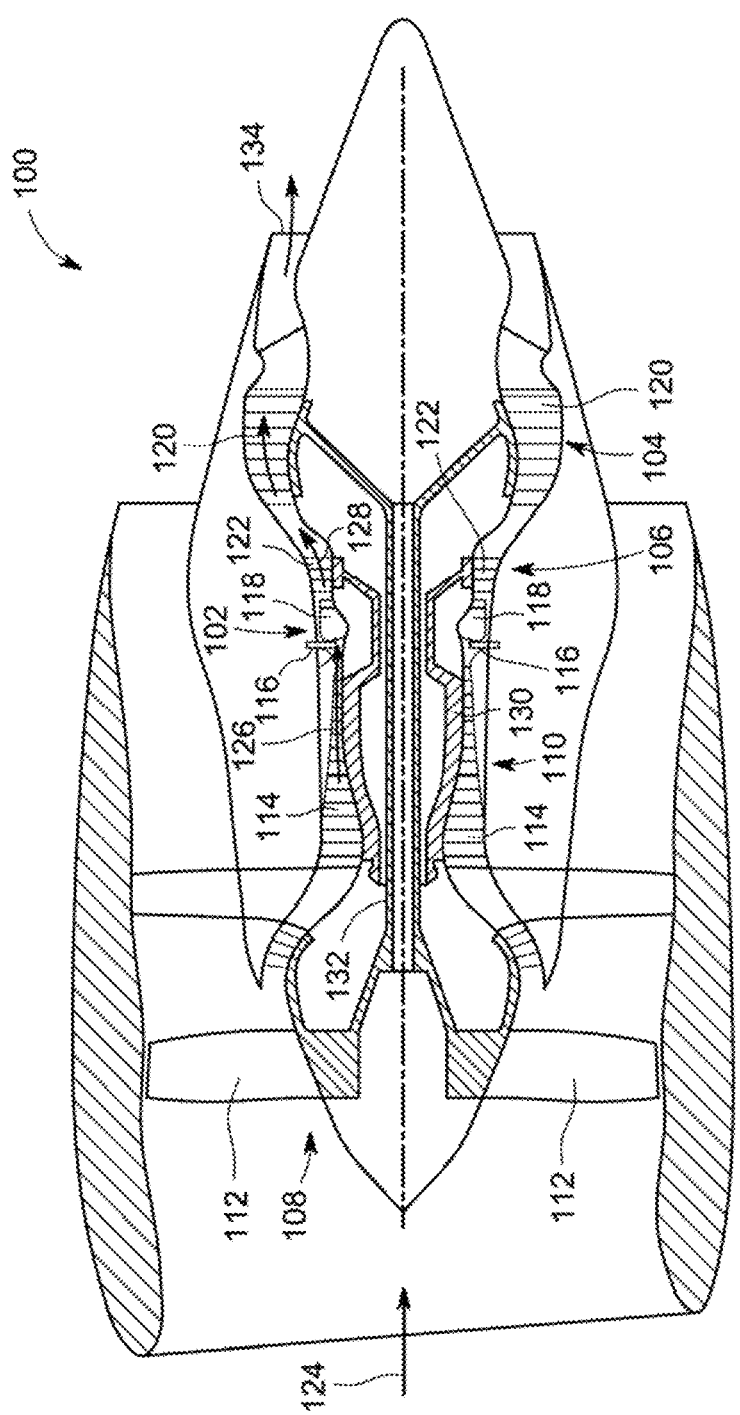
FIG. 1 is a schematic illustration of an exemplary gas turbine engine.

FIG. 1 is a schematic illustration of an exemplary gas turbine engine, indicated generally at 100. In the exemplary embodiment, gas turbine engine 100 includes a combustor assembly 102, a low-pressure turbine assembly 104 and a high-pressure turbine assembly 106, collectively referred to as turbine assemblies 104 and 106, Gas turbine engine 100 also includes a low-pressure compressor assembly 108 and a high-pressure compressor assembly 110, generally referred to as compressor assemblies 108 and 110. In the exemplary embodiment, gas turbine engine 100 is an aircraft engine, although in alternative embodiments, gas turbine engine 100 may be any other suitable gas turbine engine, such as an electric power generation gas turbine engine or a land-based gas turbine engine.

Low-pressure compressor assembly 108 and high-pressure compressor assembly 110 each include a plurality of fan blades 112 and 114, respectively, for compressing ambient air flowing into gas turbine engine 100. Combustor assembly 102 includes a plurality of fuel mixers 116 for mixing fuel with pressurized air and/or injecting foci or an air/fuel mixture into a combustion chamber 118. Low-pressure turbine assembly 104 and high-pressure turbine assembly 106 each include a plurality of turbine blades 120 and 122, respectively.

In operation, ambient air, represented by arrow 124, enters gas turbine engine 100 and is pressurized by low-pressure compressor assembly 108 and/or high-pressure compressor assembly 110. Pressurized air, represented by arrow 126, is mixed with fuel via fuel mixers 116, and combusted within combustion chamber 118, producing high-energy combustion products, represented by arrow 128. Combustion products 128 flow from combustion chamber 118 to high-pressure turbine assembly 106 and drive high-pressure compressor assembly 110 via a first drive shaft 130. Combustion products 128 then flow to low-pressure turbine assembly 104 and drive low-pressure compressor assembly 108 via a second drive shaft 132. Combustion products 128 exit gas turbine engine 100 through an exhaust nozzle 134, and provide at least a portion of the jet propulsive thrust of the gas turbine engine 100.

The components of gas turbine engine 100 may be subjected to vibrational forces during operation, resulting in part from rotation of compressor assemblies 108 and 110 and turbine assemblies 104 and 106, and the combustion of gases within gas turbine engine 100.

Figure 2:
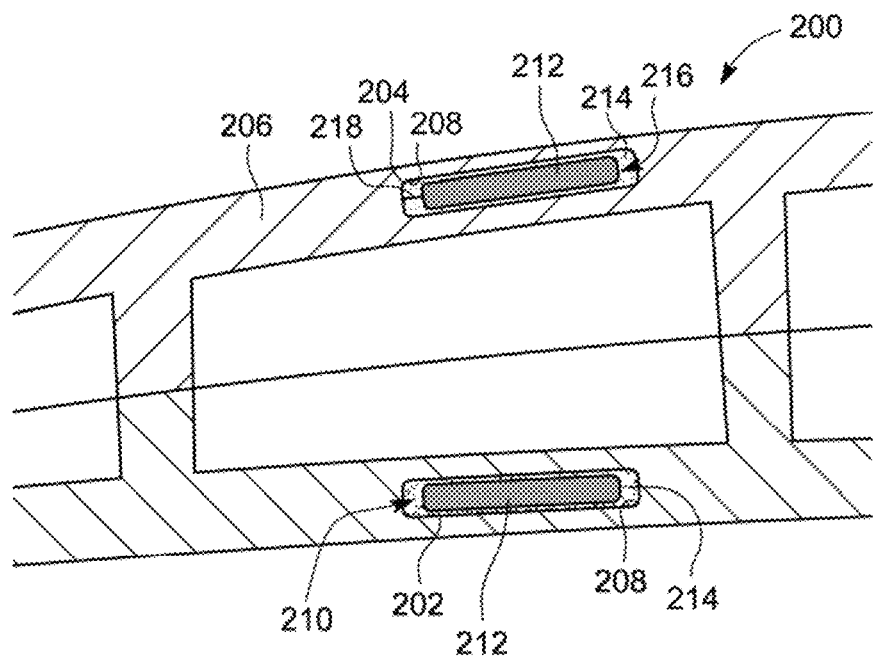
FIG. 2 is a partial cross-section of an exemplary component of the gas turbine engine shown in FIG. 1.

FIG. 2 is a partial cross-section of an exemplary component 200 of gas turbine engine 100. In the exemplary embodiment, component 200 is a turbine blade 120, in particular, a hollow turbine blade, although in alternative embodiments, component 200 may be any other component of gas turbine engine 100, such as fan blades 112 and 114 or fuel mixer 116, in yet further alternative embodiments, component 200 may be a component other than a component of a gas turbine engine 100.

In the exemplary embodiment, component 200 is fabricated by a selective laser sintering (SLS) process, although any other suitable additive manufacturing process (also known as rapid prototyping, rapid manufacturing, and 3D printing) may be used to fabricate component 200, such as direct metal laser sintering (DMLS), electron beam melting (EBM), selective heat sintering (SHS), or stereolithography (SLA). Component 200 may be fabricated from any suitable additive manufacturing material, such as metal powder(s) (e.g., cobalt chrome, steels, aluminum, titanium and/or nickel alloys), gas atomized metal powder(s), thermoplastic powder(s) (e.g., polylactic acid (PLA), acrylonitrile butadiene styrene (ABS), and/or high-density polyethylene (HDPE)), photopolymer resin(s) (e.g., UV-curable photopolymers), thermoset resin(s), thermoplastic resin(s), or any other suitable material that enables component 200 to function as described herein. As used herein, the term "additive manufacturing material" includes any materials that may be used to fabricate a component by an additive manufacturing process, such as the additive manufacturing processes described above.

Component 200 includes a first cavity 202 and a second cavity 204, each defined within a body 206 of component 200. First cavity 202 and second cavity 204 are each defined by one or more cavity walls 208, and are completely enclosed within body 206 of component 200. In alternative embodiments, one or more cavities 202 and 204 may be only partially enclosed within body 206. In the exemplary embodiment, component 200 includes a total of two cavities 202 and 204, although component 200 may include any suitable number of cavities 202 and 204 that enables component 200 to function as described herein. Further, in the exemplary embodiment, first cavity 202 and second cavity 204 each have a generally rectangular shape, although in alternative embodiments, first cavity 202 and second cavity 204 may have any suitable shape that enables component 200 to function as described herein.

First cavity 202 includes a vibration damper 210 enclosed therein. Vibration damper 210 includes a solidified element 212 and a flowable medium 214, in operation, vibrational energy traveling through component 200 causes solidified element 212 and flowable medium 214 to interact and collide with one another, resulting in kinetic and/or frictional damping of vibrational energy.

In the exemplary embodiment, solidified element 212 is fabricated during the same additive manufacturing process used to fabricate component 200. Thus, solidified element 212 may be fabricated from the same additive manufacturing material used to fabricate component 200. In alternative embodiments, solidified element 212 may be fabricated from a material other than the additive manufacturing material used to fabricate component 200. Also in the exemplary embodiment, flowable medium 214 is unsolidified additive manufacturing material, i.e., additive manufacturing material that was not solidified during the fabrication of component 200. Thus, depending upon the additive manufacturing process used to fabricate component 200, flowable medium 214 may be a liquid and/or a solid. In alternative embodiments, flowable medium 214 may include materials other than unsolidified additive manufacturing material. For example, flowable materials other than the additive manufacturing material may be added to first cavity 202 during the fabrication of component 200.

In the exemplary embodiment, solidified element 212 is shaped substantially complementary to first cavity 202 (i.e., generally rectangularly), although in alternative embodiments, solidified element 212 may have any suitable shape that enables vibration damper 210 to function as described herein. In some embodiments, solidified element 212 may have a relatively high surface area to volume ratio to increase frictional damping. For example, the surface of solidified element 212 may be non-planar, jagged, or textured to increase the surface area to volume ratio of solidified element 212.

In the exemplary embodiment, solidified element 212 and flowable medium 214 occupy at least about 95% of the volume enclosed by first cavity 202 and, more particularly, at least about 98% of the volume enclosed by first cavity 202. In alternative embodiments, solidified element 212 and flowable medium 214 may occupy less than about 95% of the volume enclosed by first cavity 202. In yet further alternative embodiments, before first cavity 202 is completely formed during the additive manufacturing process, some of the unsolidified additive manufacturing material remaining in first cavity 202 may be removed such that solidified element 212 and flowable medium 214 occupy less than substantially the entire volume enclosed by first cavity 202.

In the exemplary embodiment, solidified element 212 occupies approximately 80% of the volume enclosed by first cavity 202, and flowable medium 214 occupies a range of between about 10-20% of the volume enclosed by first cavity 202. In alternative embodiments, the relative volumes occupied by solidified element 212 and flowable medium 214 may vary. For example, the size of solidified element 212 may vary such that solidified element 212 occupies a range of between about 20% and about 90% of the volume enclosed by first cavity 202, and more specifically, between about 50% to about 80% of the volume enclosed by first cavity 202. The amount of flowable medium 214 enclosed within first cavity 202 may also vary (for example, by removing unsolidified additive manufacturing material during the fabrication process) such that flowable medium 214 occupies a range of between about 5% and about 100% of the volume enclosed by first cavity 202, and more specifically, between about 20% to about 50% of the volume enclosed by first cavity 202.

Solidified element 212 of vibration damper 210 is mechanically detached from cavity walls 208, and is at least partially suspended by flowable medium 214. Second cavity 204 includes a vibration damper 216 substantially similar to vibration damper 210, except that solidified element 212 of vibration damper 216 is mechanically coupled to cavity wall 208 via a connecting element 218. Connecting element 218 may be configured to be detached from cavity wall 208 and/or solidified element 212 after solidified element 212 is partially formed. For example, to enable solidified element 212 to be completely suspended by flowable medium 214, connecting element 218 may be structurally weak and/or unstable such that connecting element 218 may be detached from cavity wall 208 and/or solidified element 212 during post-fabrication processing and/or during normal use of component 200. Alternatively, connecting element 218 may be configured to be permanently coupled to solidified element 212 and cavity wall 208 such that connecting element 218 is part of vibration damper 216.

In the exemplary embodiment, solidified element 212 of vibration dampener 216 is mechanically coupled to cavity wall 208 at a single point along the cavity wall 208, although in alternative embodiments, solidified element 212 may be mechanically coupled to cavity wall 206 at any suitable number of points along cavity wall 208 that enables vibration damper 216 to function as described herein. In embodiments where connecting element 218 is configured to be detached from cavity wall 208 and/or solidified element 212, solidified element 212 may be mechanically coupled to cavity wall 208 at no more than two points along cavity wall 208.

In the exemplary embodiment, vibration dampers 210 and 216 each include a single solidified element 212 although in alternative embodiments, one or both vibration dampers 210 and 216 may include more than one solidified element 212. For example, one or more vibration dampers 210 and 216 may include two or more distinct solidified elements 212 disposed within a respective cavity 202 and 204.

Figure 3:
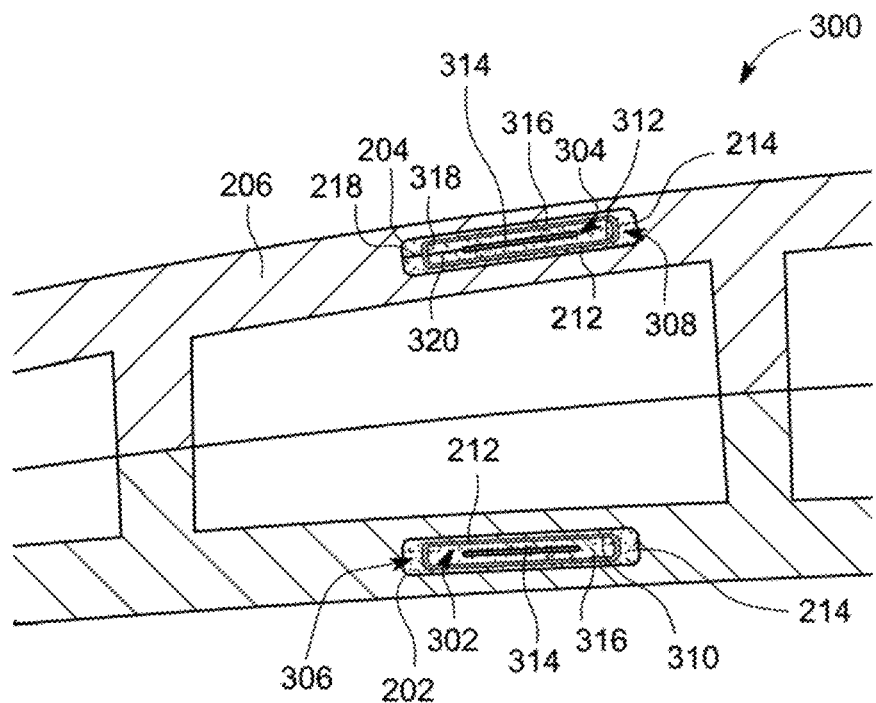
FIG. 3 is a partial cross-section of an exemplary alternative component suitable for use in the gas turbine engine shown in FIG. 1.

FIG. 3 is a partial cross-section of an exemplary alternative component 300 suitable for use in gas turbine engine 100. Component 300 is substantially identical to component 200 (shown in FIG. 2), with the exception that component 300 includes secondary vibration dampers 302 and 304 in addition to primary vibration dampers 306 and 308. As such, elements shown in FIG. 3 are labeled with the same reference numbers used in FIG. 2.

Primary vibration dampers 306 and 308 are substantially identical to vibration dampers 210 and 216, with the exception that primary vibration dampers 306, 308 include secondary vibration dampers 302 and 304. As shown in FIG. 3, solidified elements 212 of each primary vibration damper 306 and 308 define third and fourth cavities 310 and 312 completely enclosed within the respective solidified element 212. Third and fourth cavities 310 and 312 each include a secondary vibration damper 302 and 304 disposed therein. Secondary vibration dampers 302 and 304 may have configurations substantially similar to vibration dampers 210 and 216 (shown in FIG. 2) and/or primary vibration dampers 306 and 308 and/or may include any of the features of vibration dampers 210 and 216 described above with reference to FIG. 2 and/or any of the features of primary vibration dampers 306 and 308 described herein. For example, each secondary vibration damper 302 and 304 includes a second solidified element 314 and a second flowable medium 316. Further, second solidified element 314 of secondary vibration damper 304 is mechanically coupled to a cavity wall 318 of fourth cavity 312 by a connecting element 320 substantially similar to connecting element 218.

Figure 4:
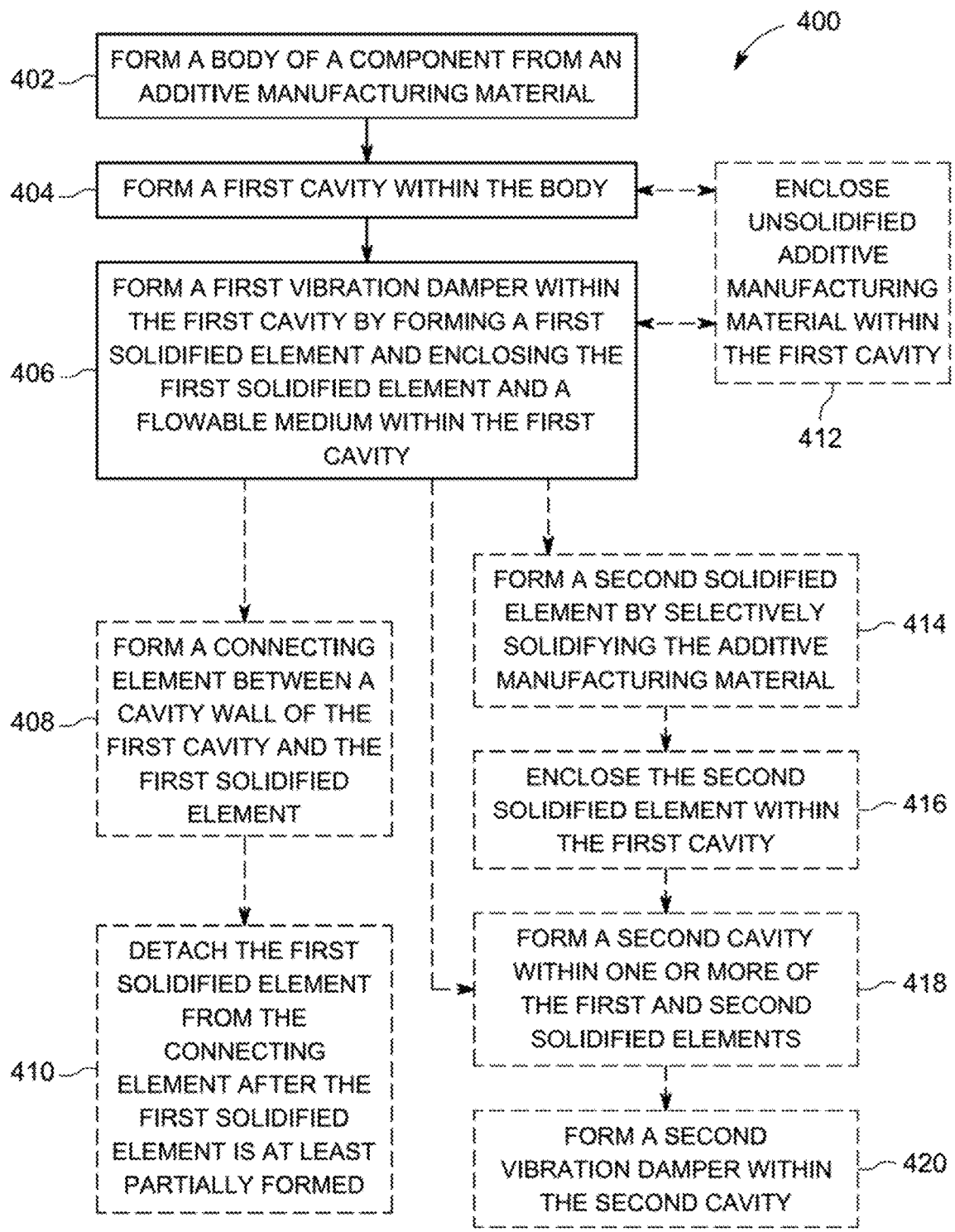
FIG. 4 is a flowchart of an exemplary method of forming a component by an additive manufacturing process.

FIG. 4 is a flowchart of an exemplary method of forming a component by an additive manufacturing process. In the exemplary method, vibration dampers 210, 216, 302, 304, 306, and 308 are advantageously formed in-situ dining the additive manufacturing: process used to fabricate components 200 and 300. Specifically, referring to FIG. 4, an exemplary method of forming a component, such as component 200 (shown in FIG. 2) or component 300 (shown in FIG. 3), is indicated generally at 400. A body of the component is formed 402 from an additive manufacturing material, such as metal powder(s) (e.g., cobalt, iron, aluminum, titanium and/or nickel alloys), gas atomized metal powder(s), thermoplastic powder(s), photopolymer resin(s), thermoset resin(s), or thermoplastic resin(s). A first cavity is formed 404 within the body. A first vibration damper is formed. 406 within the first cavity by forming a first solidified element by selectively solidifying the additive manufacturing material, and enclosing the first solidified element and a flowable medium within the first cavity. The first vibration damper may be formed such that the first vibration damper is shaped substantially complementary to the first cavity.

In one embodiment, a connecting element is formed 408 between a cavity wall of the first cavity and the first solidified element to support the first solidified element during the fabrication process. The first solidified element may be detached 410 from the connecting element after the first solidified element is at least partially formed. Optionally, the first solidified element may be detached from the connecting element after the first cavity is formed (e.g., through normal use of the component or through post-fabrication processing). Additionally or alternatively, a non-detachable connecting element may be formed between a cavity wall of the first cavity and the first solidified element.

When forming the first cavity and/or when forming the first vibration damper within the first cavity, unsolidified additive manufacturing material may be enclosed 412 within first cavity to act as a flowable medium of the first vibration damper by leaving the unsolidified manufacturing material within the first cavity (i.e., by not removing the unsolidified manufacturing material). Alternatively, other materials may be enclosed within first cavity to act as a flowable medium by adding other materials to the first cavity before the first cavity is completely formed, or enclosed.

Forming the first vibration damper includes forming 414 a second solidified element by selectively solidifying the additive manufacturing material, and enclosing 416 the second solidified element within the first cavity. Additionally or alternatively, a second cavity may be formed 418 within one or more of the first and second solidified elements, and a second vibration damper may be formed 420 within the second cavity.

The above described components, systems, and methods enable efficient use of additive manufacturing technology to form vibration dampers within components. Specifically, the components, systems, and methods described herein take advantage of the additive nature of additive manufacturing processes by strategically capturing and enclosing unsolidified additive manufacturing material and/or solidified elements) within one or more cavities formed in the component during the additive manufacturing process. The vibration dampers may be precisely formed and strategically positioned within the component so as to not compromise the structural integrity of the component. Further, through use of additive manufacturing technology, the components, systems, and methods described herein enable formation of particle vibration dampers at locations within the component that are otherwise inaccessible. Therefore, in contrast to known articles and methods of manufacturing such articles, the components, systems, and methods described herein enable faster, more efficient fabrication of components having vibration dampers enclosed therein, and provide improved clamping performance over known articles.

An exemplary technical effect of the systems and methods described herein includes at least one of: (a) improving the vibration damping performance of components fabricated using additive manufacturing processes; and (b) reducing the amount of time and costs needed to fabricate components having vibration dampers enclosed therein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component formed by an additive manufacturing process, said component comprising:
   a body formed from an additive manufacturing material, said body defining at least a first cavity completely enclosed within said body and a second cavity completely enclosed within said body;
   a first vibration damper disposed within said first cavity, said first vibration damper comprising:
      a first flowable medium; and
      a first solidified element formed from the additive manufacturing material,
   wherein said first flowable medium surrounds said first solidified element and wherein said first solidified element is mechanically detached from said body and at least partially suspended by said first flowable medium; and
   a second vibration damper disposed within said second cavity, said second vibration damper comprising:
      a second flowable medium;
      a second solidified element formed from the additive manufacturing material,
   wherein said second flowable medium surrounds said second solidified element; and
      a connecting element coupling the second solidified element to a cavity wall of the second cavity.

2. The component in accordance with claim 1, wherein said first and/or second solidified element is shaped substantially complementary to said first cavity.

3. The component in accordance with claim 1, wherein said first vibration damper further comprises an additional solidified element formed from the additive manufacturing material, said flowable medium surrounding said second additional solidified element.

4. The component in accordance with claim 1, wherein said first and/or second cavity has a volume enclosed therein, and wherein said first solidified element and said flowable medium occupy at least about 95% of the volume enclosed by said first cavity.

5. The component in accordance with claim 1, wherein said first and/or second flowable medium comprises unsolidified additive manufacturing material.

6. The component in accordance with claim 1, wherein said additive manufacturing material comprises one of a metal powder, a thermoplastic powder, a photopolymer resin, a thermoset resin, a thermoplastic resin, or combinations thereof.

7. A gas turbine engine comprising:
   a combustor assembly including a plurality of fuel mixers;
   a turbine assembly including a plurality of turbine blades; and
   a compressor assembly including a plurality of fan blades, at least one of said combustor assembly, fuel mixers, turbine blades, and fan blades comprising a component formed according to claim 1.

8. The gas turbine engine in accordance with claim 7, wherein said first solidified element is shaped substantially complementary to said first cavity.

9. The gas turbine engine in accordance with claim 7, wherein said first vibration damper further comprises an additional solidified element formed from the additive manufacturing material, said first flowable medium surrounding said second additional solidified element.

10. The gas turbine engine in accordance with claim 7, wherein said first cavity has a volume enclosed therein, and wherein said first solidified element and said first flowable medium occupy at least about 95% of the volume enclosed by said first cavity.

11. The gas turbine engine in accordance with claim 7, wherein said first flowable medium comprises unsolidified additive manufacturing material.

12. The gas turbine engine in accordance with claim 7, wherein said additive manufacturing material comprises one of a metal powder, a thermoplastic powder, a photopolymer resin, a thermoset resin, a thermoplastic resin, or combinations thereof.

13. The component in accordance with claim 1, wherein said first cavity has a volume enclosed therein, and wherein the first solidified element occupies a range of between about 20% and about 90% of the volume enclosed by the first cavity.

14. The component in accordance with claim 13, wherein the first solidified element occupies a range of between about 50% and about 80% of the volume enclosed by the first cavity.

15. The component in accordance with claim 13, wherein the first flowable medium occupies a range of between about 20% to about 50% of the volume enclosed by the first cavity.

16. The component in accordance with claim 1, wherein said connecting element is configured to be mechanically detached from at least one of the cavity wall or the second solidified element.

* * * * *